Jan. 12, 1943.                H. W. SCHUETTE                2,308,111
                              OCTOZONE GENERATOR
                              Filed July 10, 1939            3 Sheets-Sheet 1

INVENTOR
HERMAN W. SCHUETTE
BY
ATTORNEY.

Jan. 12, 1943. H. W. SCHUETTE 2,308,111
OCTOZONE GENERATOR
Filed July 10, 1939 3 Sheets-Sheet 2

INVENTOR
HERMAN W. SCHUETTE
BY
ATTORNEY.

Patented Jan. 12, 1943

2,308,111

UNITED STATES PATENT OFFICE 2,308,111

OCTOZONE GENERATOR

Herman W. Schuette, St. Louis, Mo.

Application July 10, 1939, Serial No. 283,590

1 Claim. (Cl. 204—320)

This invention relates generally to therapeutic apparatus and, more particularly, to a certain new and useful improvement in octozone generators.

Pertinent to my invention, is a brief history of the medical and therapeutic application of oxygen, which began almost as early as the chemical discovery by Priestley and Lavoisier, who, early in their experiments, recognized the importance of oxygen for respiration and other life processes.

Many different types of applications, such as inhalation and sub-cutaneous injection, have been employed from time to time in the treatment of a wide variety of body afflictions. In recent years, the development of the oxygen polymer octozone or so-called heavy oxygen, the molecular formula of which has been variously reported as $O_3$, $O_6$, $O_4$, has proven extremely successful in a wide variety of cases. Some years ago, its property of hyperoxidation, its powerful liberation of nascent oxygen, its facility for diffusing rapidly in the tissues, and its relative stability at ordinary temperature and pressure, have led to the application of octozone in all fields of pathology requiring the action of a highly labile bactericide. The results, according to several authors, have been extremely satisfactory. Thus Parkes and Buckley have reported the satisfactory cure of chronic rheumatism, neuritic and neuralgic sciatica, varicose ulcer, anthrax, and diabetic gangrene. Malleterre has reported successful treatment of albuminuria, ankylosis, sciatica, prostatitis, gonorrhea, anthrax, and varicose ulcer. And Hans, reporting from the middle west, has found an extremely successful application for octozone in the treatment of sinusitis.

By reason of the fact that octozone is an allotropic form of oxygen and at normal conditions of temperature and pressure exists in gaseous form, octozone is relatively difficult and expensive to manufacture in quantities and cannot be satisfactorily stored for long periods of time or shipped over great distances. In addition, octozone is somewhat difficult to administer and has not been generally available to the medical profession.

My invention has accordingly for its primary objects the provision of octozone generating apparatus which is comparatively inexpensive and economical in structure and operation, which is capable of producing a relatively high yield of octozone at comparatively low cost, which is continuous in operation and may be started up or shut down at the will of the operator without material waste, which is capable of producing a continuous flow under controlled pressure of fresh, high-concentrated octozone, which is sufficiently low in cost to be widely available to the medical profession, and which is highly efficient in the performance of its stated and intended functions.

And with the above and other objects in view, my invention resides in the novel features of form, construction, arrangement, and combination of parts presently described and pointed out in the claims.

In the accompanying drawings (3 sheets),

Figure 1 is a reduced perspective view of an octozone generator constructed in accordance with and embodying my present invention;

Figure 2:
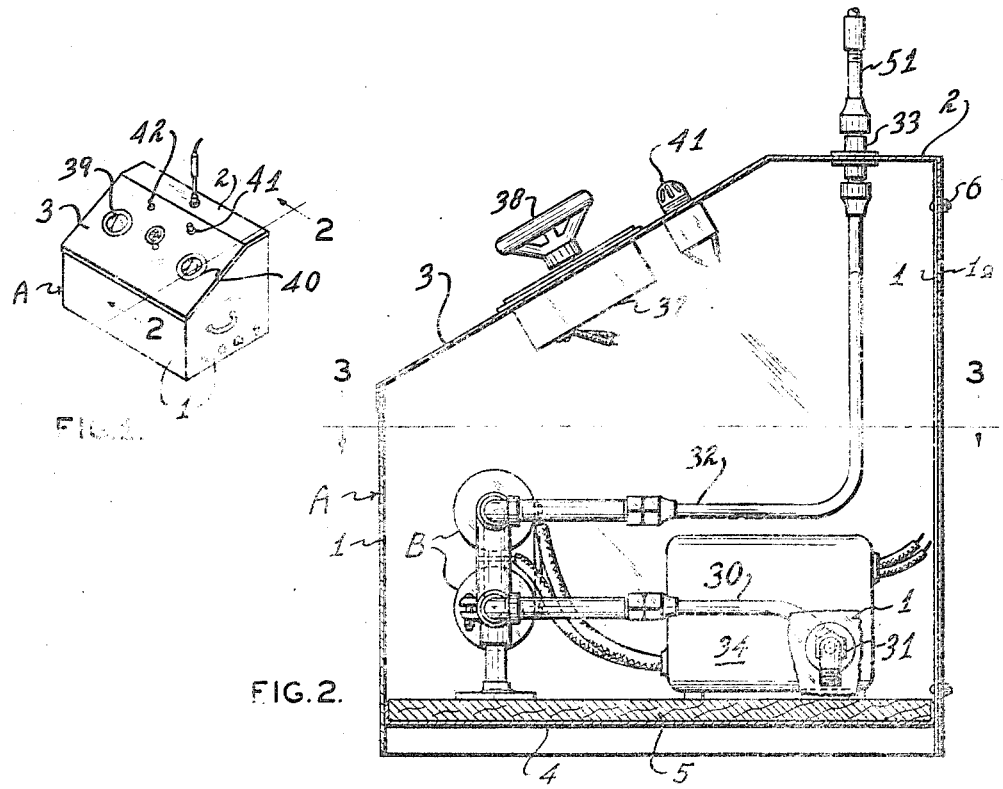
Figure 2 is an enlarged vertical sectional view of the generator, taken approximately along the line 2—2, Figure 1.

Referring now more in detail and by reference characters to the drawings, which illustrate practical embodiments of my present invention, the octozone generator comprises, reference being first particularly made to Figures 1 to 7, both inclusive, a housing or cabinet A including upstanding front, rear, and side walls 1, a top wall consisting preferably of a flat horizontally disposed portion 2 and an obliquely disposed control-panel 3, and a horizontally disposed bottom wall 4, all suitably joined together in housing-formation. Preferably, the bottom wall 4 is provided upon its inner upwardly presented face with a mounting panel or base block 5 constructed preferably of wood or other suitable material, and the rear wall 1 includes a panel 1ª preferably removably held in place by conventional bolts 6 for providing convenient access to the interior of the cabinet A.

Disposed longitudinally within the cabinet A, is a pair of suitably spaced parallel generating cylinders or electrolysis units B each comprising a central conduit or tube 7 constructed preferably of aluminum or other suitable material provided with relatively long threaded and slightly tapering end-portions 8. Sleeved concentrically on each tube 7 intermediate its ends, is a diametrally enlarged tubular electrode 9, which preferably includes a pair of turned end-spools 10 having diametrically reduced barrels 11 for tightly fitting a hollow tubular so-called intermediate member 12. Centrally, within its bore, the tube 7 is equipped with a sealing plug 13 and adjacent to and outwardly of the opposite ends of the electrode 9 is provided with pairs of diametrally opposed openings 14.

Figure 4:
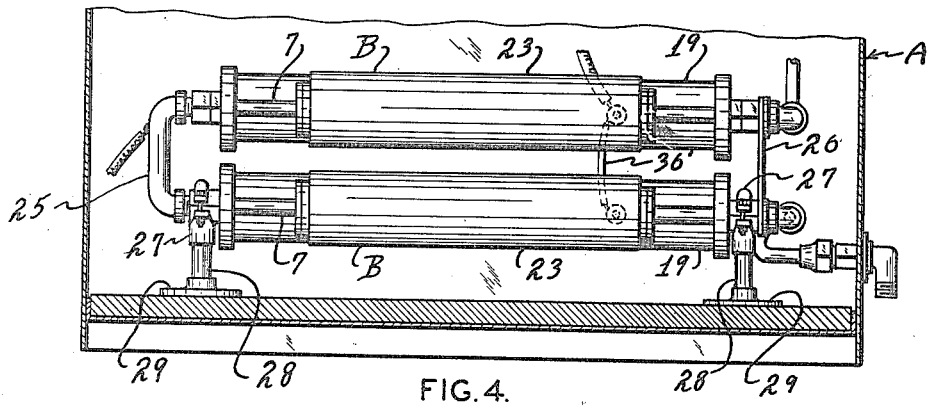
Figure 4 is a fragmental sectional view of the generator, taken approximately along the line 4—4, Figure 3.
Figures 5, 6:
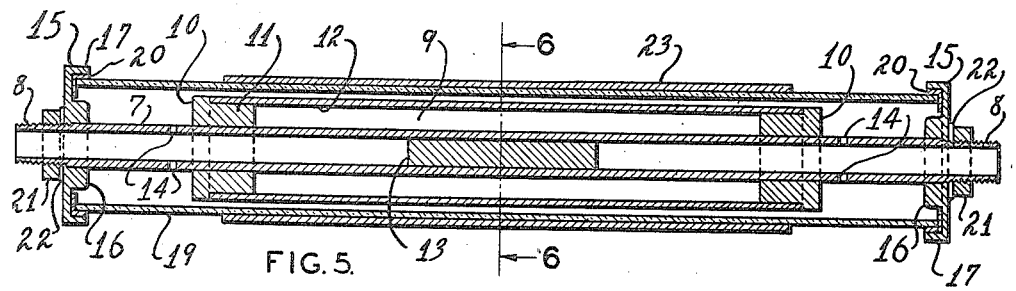
Figure 5 is an enlarged longitudinal sectional view of one of the tubes of the generator.
Figure 6 is a transverse sectional view of the generator tube, taken approximately along the line 6—6, Figure 5.

Mounted upon the opposite ends of the tube 7, are flanged end-caps 15 centrally apertured and bossed, as at 16, for embracingly fitting upon and engaging with the end-portions of the tube 7, the peripheral flanges 17 of the caps 15, in turn, fitting over the opposite ends of a concentrically disposed dielectric tube 19 extending co-axially therebetween and permanently secured in place by a gas-tight seal 20 of mastic cement or other suitable material and the end-caps 15 being also secured and sealed upon the tube 7 by means preferably of nuts 21 and interposed washers 22. Sleeved concentrically snugly upon the dielectric tube 19 intermediate its ends, is a tubular electrode 23 wholly disconnected from the end-caps 15 and suitably provided with a conventional binding post 24, all for purposes presently fully appearing and as best seen in Figures 4, 5, and 6.

Having threaded connection with the end-portions 8 of the tubes 7 and connecting the two generating cylinders B in series, is a rigid U-shaped tube 25, the tubes 7 at their opposite end being rigidly joined by a conventional spacing-bar 26. The tubes B, so connected, are then disposed within the cabinet A in horizontally superposed relation, the projecting end-portions 8 of the tube 7 of the lower cylinder B being releasably gripped between and supported by pairs of clamps 27 mounted on posts 28 upstanding from base-members 29 suitably fixed upon the bottom block 6.

Figure 3:
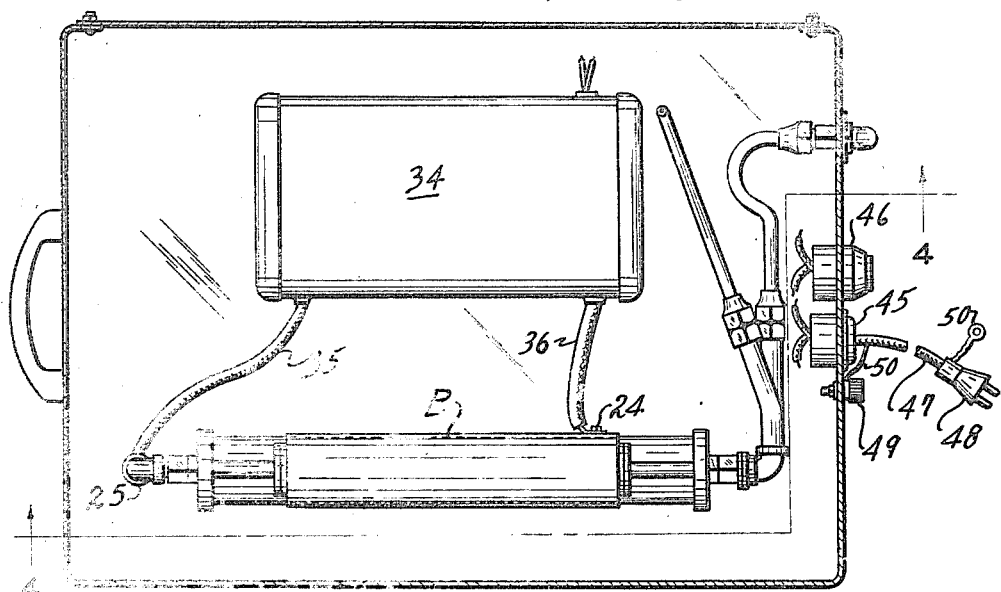
Figure 3 is a horizontal sectional view of the generator, taken approximately along the line 3—3, Figure 2.

At its opposite end, one of the tubes 7 is connected through conventional piping 30 with a nipple 31 mounted in, and extending through, one of the side walls 1 of the cabinet A, and the other tube 7 is connected through conventional piping 32 with a nipple 33 mounted in, and extending through, the cabinet top wall portion 2, all as best seen in Figures 2 and 3 and for purposes presently fully appearing.

Suitably mounted upon the baseboard 5, is a high voltage transformer 34 of any conventional type preferably designed for connection on its low tension side to 60 cycle A. C. current ranging from 80 to 140 volts and having a high tension coil adapted to deliver a transformed current of approximately 15,000 volts, the transformer 34 having electrical connection through its one high tension lead 35 with the connector tube 25 and through its other high tension lead 36 and connector 36' and binding posts 24 with the outer electrodes 23, all as best seen in Figures 3 and 4.

Mounted suitably upon the control panel 3, is a rheostat 37 preferably having a resistance of approximately 100 ohms and provided with a control handle or wheel 38 conveniently accessible upon the outer face of the panel 3, as shown. Also mounted upon the control panel 3 preferably symmetrically on opposite sides of the control handle 38, are a conventional voltmeter 39 and a conventional ammeter 40, the control panel 3 being also provided with a conveniently positioned pilot light 41 and control switch 42.

Figure 7:
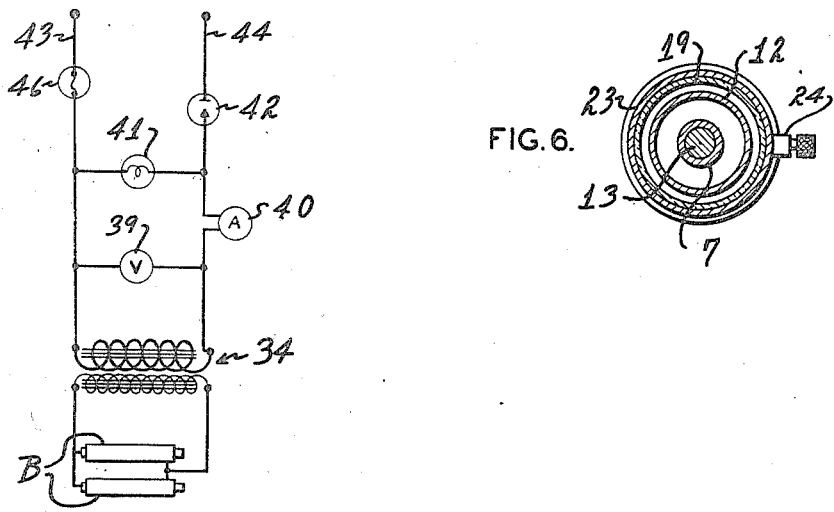
Figure 7 is a schematic wiring diagram of the generator.
Figure 8:
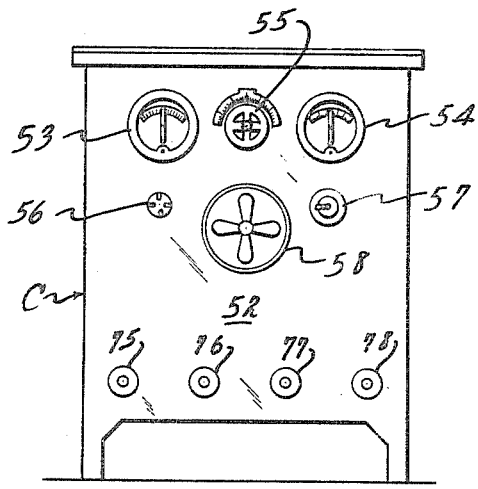
Figures 8 and 9 are front and side elevational views, respectively, of a generator of clinical size embodying my present invention.
Figure 9:
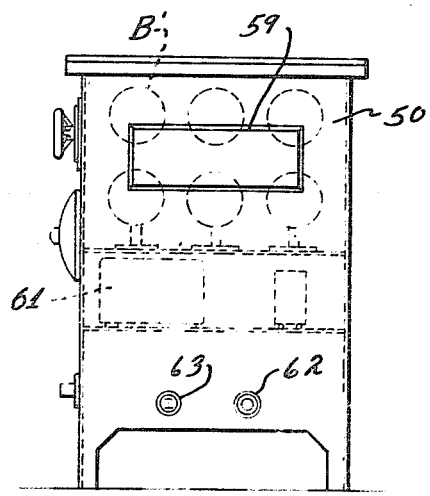

The rheostat 37, voltmeter 39, ammeter 40, pilot-light 41, and main switch 42 are connected, as shown in the wiring diagram, Figure 7, across the transformer low tension leads 43, 44, which are, in turn, connected to a conventional electrical inlet plug 45 in series with a conventional replaceable fuse-block 46 adapted for connection by means of a conventional flexible cord 47 and connector plug 48 with any suitable source of electric current (not shown). A side wall 1 of the cabinet A is also provided with a conventional binding post 49 for detachable connection with a third or grounding wire 50 of the cord 47.

In use and practice, the nipple 31 is connected through a conventional reducing valve to an oxygen tank (not shown). The companion nipple 33 is connected through an appliance tube 51 to an inhalator hood or other administering instrument, also not shown. The circuit through the main switch 42 is then closed, the rheostat 37 being set to such a position as will produce the desired voltage and amperage in the transformer 34. The oxygen then enters the tube 7 of the lower generating cylinder B and flows outwardly therefrom through the adjacent or first apertures 14 into the surrounding chamber provided by the end-caps 15 and tube 19 or, more specifically, between the electrode 9 and the electrode 23, which function in the manner of high frequency condensers to impress across the gas a high voltage discharge. The charged gas then flows through the distant or second apertures 14 back into the lower tube 7 and thence outwardly through the connector tube 25 into the tube 7 of the upper generator tube B and between the electrodes 9 and 23 thereof in substantially the same manner as previously described.

The flowing oxygen, in the course of being twice subjected to the high voltage field, is ultimately converted into octozone. The exact molecular mechanism of this change is not precisely known. The oxygen is probably converted initially to ozone in the first generating cylinder B and is thereupon further polymerized in the second generating cylinder B to octozone, which then flows outwardly through the pipe 32 and the appliance tube 51 to the attached inhalator cone or other administering appliance.

It should be noted that the conduit tubes 7 of the generating cylinders B are electrically charged, so that the gas passing between the electrodes 9, 23, is initially charged prior to being directly subjected to the high voltage field. This, it is believed, substantially increases the efficiency of operation of the generating cylinders B and provides a very high percentage yield. It should also be noted that the intensity of electric voltage may be varied by changing the control rheostat 37 in accordance with the rate of flow through the apparatus, so as to achieve the desired amount of conversion required for any particular use.

For clinical purposes, it has been found desirable that a relatively greater supply of octozone be supplied and accordingly for such purpose a large floor cabinet C of any conventional design is contemplated, the cabinet C having a front wall 52 equipped with a conventional ammeter 53, a conventional voltmeter 54, a control rheostat 55, a pilot light 56, and a main control switch 57. Also mounted in, and extending through, the cabinet wall 52, is a conventional ventilating fan 58 for circulating air through the cabinet C and out through a vent grill 59 located in one of the cabinet side walls 50, as shown.

Suitably mounted within the cabinet C, is a plurality of pairs of series connected generating cylinders B' substantially identical in construction and operation with the generating cylinders B of the cabinet A.

Also mounted within the cabinet C, is a 110–15,000 volt high frequency transformer 61 connected on its high tension side to the generating cylinders B' and on its low tension side through the ammeter 53, voltmeter 54, and rheostat 55 through a conventional fuse plug 62 and conventional inlet plug 63 to any conventional source of electric current, in substantially the manner previously described and shown in the schematic wiring diagram of Figure 7.

The pairs of generator tubes B' are connected in parallel by an intake header pipe 64 and an outlet header pipe 65. The inlet header pipe 64 is, in turn, connected through a conventional pipe 66 to the discharge ports of two conventional solenoid valves 67, 68, and the outlet header 65 is likewise connected through a conventional pipe line 69 to the intake ports of two conventional solenoid valves 70, 71. Interposed in the pipe line 69, is an electrically actuated pressure relief valve 72 of any conventional type, which is connected through leads 73, 74, to any suitable source of electric current and is adapted to function as a safety valve in the event that any abnormal gas pressure is built up in the apparatus.

Figure 10:
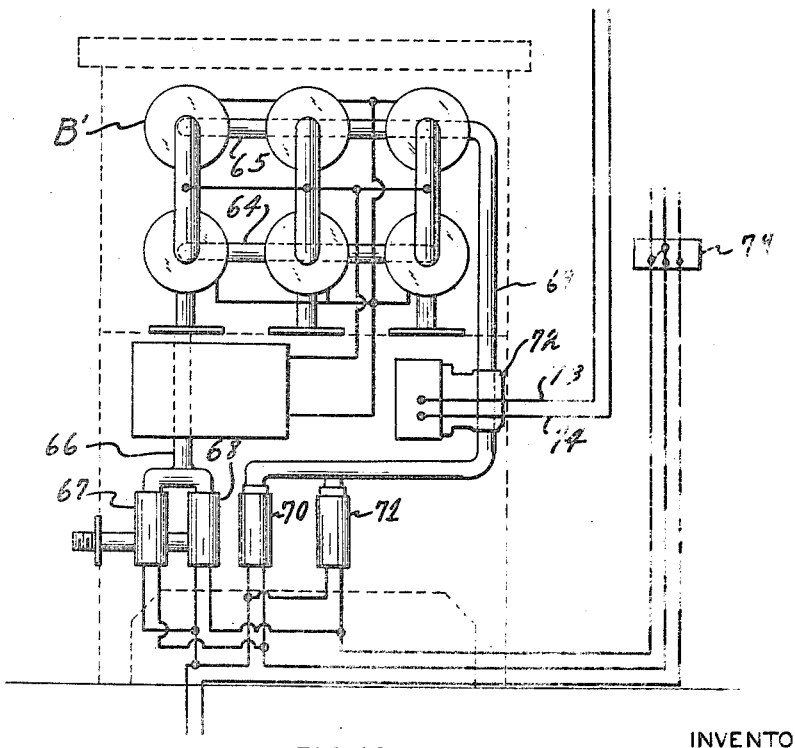
Figure 10 is a diagrammatic view of the several parts and wiring of the clinical generator of Figures 8 and 9.

Mounted in, and extending through, the cabinet front wall 52, are two outlet nipples 75, 76, and two inlet nipples 77, 78, the outlet nipples 75, 76, being connected to the discharge ports of the solenoid valves 70, 71, and the inlet nipples 77, 78, being respectively connected to the discharge ports of the solenoid valves 67, 68. The solenoid valves 67, 70, are electrically connected in parallel to one side of a remote 3-way switch 79, and the solenoid valves 68, 71, are similarly connected in parallel to the other side of the switch 79 for alternate operation, as best shown in Figure 10 and for purposes presently fully appearing.

The inlet nipples 75, 76, are respectively connected through suitable piping and a dual reducing valve (not shown) to a suitable oxygen tank (also not shown), so that the oxygen may be supplied at two different pressures.

In installing the clinical generator C, a pair of conduit pipes are connected respectively to the nipples 77, 78, and run to various points in the room or building where the supplied octozone is to be used. At such various points of use, a 3-way switch, as, for example, the switch 79, is installed. Thereupon, should the operator desire a relatively concentrated or "dense" octozone, the switch 79 is closed to energize the solenoid valves 67, 68, permitting the low pressure oxygen to flow through the apparatus. Since the rate of flow is proportionate to the pressure, the low pressure oxygen will travel through the generating cylinders B' at a relatively slow rate and be more completely converted to octozone. On the other hand, should a relatively low concentration or "light" octozone be desired, the switch 79 may be thrown over to its other contact position, allowing the pressure solenoid valves 67, 70, to close, simultaneously opening up the high pressure solenoid valves 68, 71, and permitting high pressure oxygen to flow through the generating cylinders B'. Since the high pressure oxygen flows more rapidly, the conversion to octozone will be relatively incomplete and the percentage of octozone in the gas delivered will be correspondingly lower.

It might be added, in this connection, that it has also been found desirable to utilize the solenoid valves 70, 71, on the delivery side of the generator tubes B' in order that air and moisture will not diffuse backwardly into the generator tubes B' when the apparatus is shut down. It will, of course, be evident that the inhalator mask or other administering device may be connected to either of the clinical supply lines, depending upon the concentration of octozone required.

For some unexplainable reason octozone generating equipment seemingly produces a relatively high condensation of moisture from the surrounding atmosphere, a factor which causes considerable moisture to collect and deposit within and upon the walls of the cabinet C, as well as also upon other parts of the equipment. In small size equipment, this situation is not sufficient to produce any appreciable effect upon the apparatus. In large size equipment, however, it has been found desirable to utilize the ventilating fan 58 for maintaining the air within the cabinet C in constant motion for eliminating excess condensation or deposition of moisture.

It also might be added in this connection that the octozone generated by the apparatus of my present invention is extremely deleterious in its effect upon a great many substances, such as ordinary rubber. Further, the high voltages in the generator tubes B, B', tend to disintegrate many substances which might normally appear to be available for use in the electrodes and make necessary the employment in the apparatus of neoprene or similar relatively non-oxidizable substance, the use of rubber-insulated wire or rubber gaskets anywhere in the apparatus being practically impossible. Similarly, the employed piping and other metallic parts should be constructed preferably of aluminum rather than iron or copper and the dielectric tubes 19 should preferably be of glass or similar dielectric material.

The apparatus is exceedingly efficient in the performance of its intended functions, and it should be understood that changes and modifications in the form, construction, arrangement, and combination of the several parts of the apparatus may be made and substituted for those herein shown and described without departing from the nature and principle of my invention.

Having thus described my invention, what I claim and desire to secure by Letters Patent is,

An octozone generator comprising two units each including a dielectric tube having transverse end closure members, a metallic tube mounted at its ends in and extending axially through the dielectric tube, said tube being plugged intermediate its ends and apertured on opposite sides of the plug for communication with the interior of the dielectric tube, a tubular metallic sleeve mounted snugly on and extending around the outer face of the dielectric tube and spaced at its ends a substantial distance from the end closure members, the metallic tube of one of said units being connected at one end to an oxygen supply line and at the other end to one end of the metallic tube of the other unit, the latter being in turn connected at its other end to a discharge line, means for imposing a relatively high voltage across both metallic tubes and sleeves, whereby to convert oxygen to ozone in the first of said units and the ozone to octozone in the other of said units.

HERMAN W. SCHUETTE.